Patented Aug. 2, 1949

2,477,892

UNITED STATES PATENT OFFICE 2,477,892

INSECTICIDE LITTER AND BEDDING FOR POULTRY AND OTHER ANIMALS

Armas Paquette, North Grosvenordale, Conn.

No Drawing. Application December 29, 1943,
Serial No. 516,095

12 Claims. (Cl. 119—1)

My invention relates to a litter or spread for chicken or pigeon house floors which will kill all germs or insects prevalent in such houses especially if mixed with tobacco ashes. This litter, being in the condition of fine sand is harmless to the chickens if eaten and may, therefore, serve in place of grit. This litter will prevent droppings from sticking to the floor and dry the same by contact therewith and, therefore, the droppings may easily be picked up, when dry, and removed.

As this litter is white, it will tend to make the coop brighter and lighter with a mat or covering of from one fourth to one half inch thick, and such mat or covering of litter on the floor will aid in making the chicken coop fireproof. Breakage of eggs, when falling on a half inch thick litter mat is prevented by the cushion formed, and all odors from droppings will disappear as well as germs and lice in nests if dusted with this litter which as a whole will keep the fowl in a very healthy condition, particularly as dampness cannot prevail wherever this litter is applied, even in very damp cellars.

This litter is prepared in the following manner:

I take silica such as quartz, and feldspar and pulverize them into very fine powder and mix thoroughly. This mixture has the appearance and condition of exceedingly fine sand, almost as white as sugar.

This sand-like mixture I heat in a kettle, when at a certain temperature, about 250° F., it boils like water, whereby all humidity is driven off and the sand sterilized at about 230° F.

This sand-like mixture is then ready for use as a litter for the chicken coops floor, as a dust in the nests, and when applied hot it will kill all germs and insects and dry up floors and droppings thereon. As an insecticide this property is enhanced by mixing with dry tobacco ashes or sprinkling the ashes thereon. A litter of one-half inch thickness will save an egg from breaking if dropped from six feet height thereon.

The sand powder should be removed for cleaning about once a week and again sterilized in order to be reconditioned and can then be used again.

Having described the invention, what is claimed as new is:

1. A combined litter, germicide and insecticide, comprising a heated mixture of finely pulverized quartz and feldspar with the admixture of tobacco ashes.

2. A combined litter, germicide and insecticide comprising a hot mixture of finely pulverized quartz and feldspar in dried and sterilized form with addition of dried tobacco ashes.

3. A method of producing a litter and duster material for hot application having germicidal and insecticidal properties, which consists in finely pulverizing quartz and feldspar into a consistency of fine sand-like powder and mixing them together, then heating the resultant sand-like powder to sterilizing temperature to remove all humidity then adding dried tobacco ashes.

4. A method of producing a litter and duster material having germicidal and insecticidal properties, which consists in finely pulverizing quartz and feldspar into a consistency of fine powder and mixing them together, then heating the resultant sand-like powder to sterilizing temperature of at least 230° F. to remove all humidity and sprinkling dry tobacco ashes over the same on said powder while still hot.

5. An insecticide litter and bedding for poultry and other animals comprising a mixture of quartz and feldspar pulverized into a very fine powder and thoroughly mixed and heated to a temperature of 250° F. to boil like water, with humidity driven off and the mixture sterilized.

6. A method of preparing a sanitary litter for poultry and other animals which comprises mixing finely pulverized quartz and feldspar to form a sand, and sterilizing the same at a temperature of about 250° F., spreading said pulverized and sterilized hot sand to a thickness of from ¼ to ½ inch to form a litter and cushion over the floor where the poultry is housed, then sprinkling dry tobacco ashes over the surface of the litter while hot, thereby killing living organisms and preventing the breaking of eggs falling thereon.

7. A method of preparing a sanitary litter for poultry and other animals which comprises finely pulverizing quartz and feldspar, mixing the said quartz and feldspar in such finely pulverized condition to form a sand light in color, sterilizing said pulverized mixture of quartz and feldspar at a temperature between 230° F. and 250° F., spreading said pulverized and sterilized hot sand to a thickness of between ¼ and ½ inch to form a litter and cushion over the floor where the poultry is housed, then sprinkling dried tobacco ashes over the surface of the litter while hot, thereby killing living organisms and preventing the breaking of eggs falling thereon.

8. A method of preparing a sanitary litter for poultry and other animals which comprises finely pulverizing quartz and feldspar, mixing the said quartz and feldspar to form a white sand, heating the said sand at a temperature at about 250° F.

until it boils to drive off all humidity and sterilize the sand at about 230° F., spreading said pulverized and sterilized hot sand to a thickness to form a litter and cushion over the floor where the poultry is housed, and then sprinkling dry tobacco ashes over the surface of the litter while hot, thereby killing living organisms.

9. A method of preparing a sanitary litter for poultry and other animals which comprises finely pulverizing quartz and feldspar, mixing said finely pulverized quartz and feldspar to form a white sand, sterilizing said sand at a temperature of about 230° F., raising said temperature to about 250° F. to boil like water whereby all humidity is driven off, spreading said pulverized and sterilized hot sand to a thickness of between ¼ and ½ inch to form a litter over the floor where the poultry is housed, then sprinkling dry tobacco ashes over the surface of the hot litter and lastly, at certain intervals, removing the litter for cleaning and reconditioning by sterilizing as before.

10. The method of preparing a sanitary litter for poultry and other animals consisting in thoroughly mixing quartz and feldspar pulverized into a very fine powder, heating the mixture to a temperature of 250° F. to boil like water to drive off all humidity, moisture and dampness and then sterilizing the mixture.

11. The improved method of preparing a sanitary insecticide litter and bedding for poultry and other animals consisting in finely pulverizing quartz and feldspar to a fine powder, thoroughly mixing said pulverized quartz and feldspar to form a white sand in powdered form, heating the mixture to a temperature of 250° F. to boil like water and sterilize the same at a temperature of about 230° F. to 250° F. and drive off all humidity.

12. The improved method of preparing a sanitary insecticide litter and bedding for poultry and other animals consisting in finely pulverizing quartz and feldspar to a fine powder, thoroughly mixing said pulverized quartz and feldspar to form a white sand in powdered form, heating the mixture to a temperature of 250° F. to boil like water and sterilize the same at a temperature of about 230° F. to 250° F. and drive off all humidity, spreading said pulverized and sterilized hot sand to a thickness sufficient to form a litter and cushion to prevent the breaking of eggs falling thereon over the floor where the poultry is housed and then sprinkling dry tobacco ashes over the surface of the litter while hot to kill living organisms.

ARMAS PAQUETTE.

REFERENCES CITED

The following references are of record in the file of this patent:

UNITED STATES PATENTS

| Number | Name | Date |
| --- | --- | --- |
| 71,780 | Nobles | Dec. 3, 1867 |
| 1,808,685 | Schindler | June 2, 1931 |
| 2,279,405 | Laughlin | Apr. 14, 1942 |